United States Patent [19]

Chromy

[11] 3,996,835
[45] Dec. 14, 1976

[54] EXPANSION ANCHOR
[75] Inventor: Franz Chromy, Feldkirch-Levis, Austria
[73] Assignee: Hilti Aktiengesellschaft, Schaan, Liechtenstein
[22] Filed: Mar. 11, 1975
[21] Appl. No.: 557,317
[30] Foreign Application Priority Data
  Mar. 18, 1974  Germany ............ 2412901
[52] U.S. Cl. ............ 85/79; 85/32 K; 85/84
[51] Int. Cl.² ............ F16B 13/04
[58] Field of Search ........ 85/76, 79, 83, 84, 63, 85/32 K, 85; 151/23, 41.74

[56] References Cited
UNITED STATES PATENTS

| | | | |
|---|---|---|---|
| 811,163 | 1/1906 | De Morsler | 85/83 |
| 998,781 | 7/1911 | Kobert | 85/84 |
| 1,052,830 | 2/1913 | Kennedy | 85/79 X |
| 1,503,515 | 8/1924 | Phillips | 85/76 |
| 1,567,713 | 12/1925 | Corser et al. | 85/79 |
| 1,937,109 | 11/1933 | Colt | 85/32 K X |
| 2,240,425 | 4/1941 | Sternberg | 85/84 |
| 2,403,810 | 7/1946 | Lord | 151/41.73 |
| 3,103,962 | 9/1963 | Neuschotz | 151/23 X |
| 3,157,417 | 11/1964 | Ruskin | 85/79 UX |
| 3,710,674 | 1/1973 | Tabor | 85/84 |

FOREIGN PATENTS OR APPLICATIONS

| | | | |
|---|---|---|---|
| 66,434 | 11/1968 | Germany | 84/ |
| 251,597 | 11/1947 | Switzerland | 85/32 K |
| 241,600 | 9/1946 | Switzerland | 85/84 |
| 1,028,664 | 5/1966 | United Kingdom | 85/84 |

Primary Examiner—Roy D. Frazier
Assistant Examiner—Thomas J. Holko
Attorney, Agent, or Firm—Toren, McGeady and Stanger

[57] ABSTRACT

An expansion anchor includes an expansion sleeve with a slot formed through the sleeve wall and extending for its axial length and an expansion body which is displaceably positionable through the slot for expanding the sleeve into contact with the wall of a hole formed to receive the sleeve. The slot is in parallel relation with the axis of the sleeve. The expanding body is a cylindrical pin which has a diameter greater than the dimension of the slot measured in the circumferential direction of the sleeve. An insert is secured within the sleeve and has a threaded bore into which a member can be secured and held within the expansion anchor.

12 Claims, 4 Drawing Figures

EXPANSION ANCHOR

SUMMARY OF THE INVENTION

The present invention is directed to an expansion anchor or straddling dowel arranged to be secured in a borehole in concrete, masonry or the like, and, more particularly, it is directed to an expansion anchor which includes an expansion sleeve having a constant width slot which extends for the axial length of the sleeve and is disposed in parallel relation with the sleeve axis and an expanding body which is displaceably engageable through said slot.

Expansion anchors, such as the type to which the present invention is directed, serve to secure objects to a base structure, such as concrete of varying strengths, and the anchors are secured into a prepared receiving hole in the base structure by expansion.

Expansion anchors are known which include a substantially conically shaped expanding body which widens at its forward end and has securing means, for example, eyes, at its rearward for attaching an object to be fastened by the anchor. Initially, such an expansion body is inserted into a prepared hole, for example, a borehole, and then an expansion sleeve is driven into the hole so that a conical part of the expanding body engages an axis-parallel slot of the sleeve for widening the sleeve as it moves into the hole. Since the expanding body is conical and the slot in the sleeve has a constant width, the sleeve is increasingly widened in the radical direction as it is driven into the hole.

Such expansion anchors have considerable drawbacks. For example, the increasing widening of the sleeve as it is advanced into the hole has the result that the forward end of the sleeve cuts into the wall of the hole which has a considerable blocking effect on the advancing movement of the sleeve. Furthermore, the guidance of the expanding body is greatly impaired by the increasing widening action of the sleeve as it is driven in, that is, in the forward or leading end of the sleeve the expanding body can be disengaged from the slot under certain circumstances. As a result, the anchoring values are irregularly distributed over the lengths of the expanding sleeve and such anchors are unsuitable for use in low strength materials, such as gas or aerated concrete.

Another drawback in expansion anchors of this type is that the member or object to be attached, is connected to the expanding body so that the expanding body is subject to the application of stress. Particularly with alternating loads, there is the risk that the expanding body will be pulled out of the expanded position so that the anchor loses its anchorage.

Therefore, it is the primary object of the present invention to afford an expansion anchor of the above type which does not have the disadvantages of previously known anchors of the same type and which is particularly suitable for use in low strength materials.

In accordance with the present invention, the problems previously experienced are overcome by utilizing an expanding body displaceably engageable within the slot in the expansion sleeve, which is a cylindrical pin.

Use of a cylindrically shaped expanding pin, whose diameter is greater than the width or dimension of the slot measured in the circumferential direction of the sleeve in its unexpanded condition, permits a problem-free assembly of the anchor, since the expansion sleeve can be inserted into the hole formed for it in an effortless manner with the subsequent insertion of the expanding pin into the slot in the sleeve. Because of the cylindrical shape of the expanding pin and the constant width of the slot over its axial length, a cylindrical widening of the sleeve is obtained and the expanding forces are transmitted from the circumferential periphery of the sleeve uniformly to the wall of the hole. As a result, there are no force peaks which overstress certain zones within the hole in the material into which the anchor is secured, so that definite and high anchoring values can be achieved for the anchor, even in soft materials. Another characteristic of the invention is the provision of a frusto-conically shaped leading end on the pin, that is, its end which is first inserted into the slot in the expansion sleeve. Such a configuration of the expanding pin considerably facilitates its introduction into the slot in the sleeve.

In addition, the trailing end of the slot into which the leading end of the pin is first inserted is provided with a corresponding frusto-conical configuration. By providing corresponding configurations on the leading end of the pin and the trailing end of the slot the assembly of the pin into the slot is further facilitated.

To afford the exact guidance of the expanding pin as it is driven through the slot in the expansion sleeve, at least one of the opposing faces of the slot has a continuous guide groove disposed in parallel relation with the axis of the sleeve.

In connecting the member to be fastened to the dowel, the trailing end of the expansion sleeve is provided with a radially inwardly directed abutment. With such an arrangement it is possible to load the expansion sleeve without displacing the expanding pin and without impairing the effect of the pin on the sleeve.

In a particularly advantageous arrangement of the invention, the abutment is formed as a ring shoulder at the trailing end of the sleeve. As a result, the ring shoulder affords a reinforcement for the trailing end of the sleeve so that this end is able to absorb greater axial force which is developed as a result of the object being secured by the expansion anchor.

Another characterizing feature of the invention is the provision of an insert which bears against the ring shoulder and has a threaded bore for securing an object to be held by the anchor. In addition, the opposite side of the insert from the abutment can be secured by retaining projections or similar means to prevent the insert from being displaced axially toward the leading end of the sleeve. Alternatively, the insert can be secured by spot welding to the ring shoulder. With such an arrangement it is possible to use inserts provided selectively with definite threaded bores so that the expansion anchor can be used for securing different objects by merely changing the inserts.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DETAILED DESCRIPTION OF THE INVENTION

Figure 1:
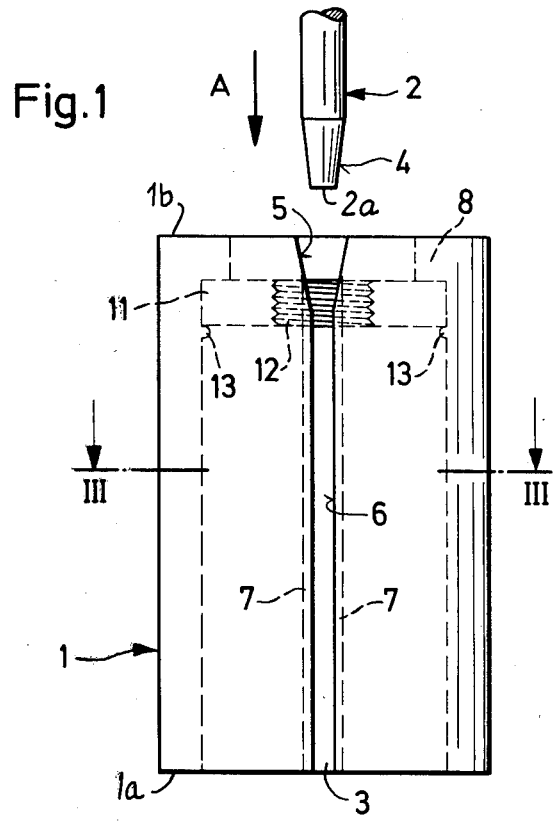
FIG. 1 is a side elevational view of an expansion anchor embodying the present invention.

In FIG. 1 an expansion anchor is shown consisting of expansion sleeve 1, a cylindrically shaped pin 2, and an insert 11 shown in dashed lines. While the expansion sleeve 1 can be formed of plastic or metal, it is preferable for reasons of strength if the pin 2 is formed of metal. In providing the expansion of the sleeve 1, the pin 2 is driven into a slot 3 extending through the sleeve 1 from its trailing end 1b to its leading end 1a. In use, the leading end 1a is inserted first into a hole formed in a receiving material into which the anchor 1 is to be secured. Similarly, the expanding pin 2 has a leading end 2a and a trailing end not shown in the drawings. The slot 3 extends in parallel relation with the axis of the sleeve 1 and in the drawing the slot is shown in the unexpanded condition, that is, before the pin 2 is driven through the slot. To facilitate the introduction of the pin 2 into the slot 3, the leading end 2a of the pin 3 has a frusto-conical configuration 4 widening rearwardly toward the cylindrical portion of the pin. Similarly, the trailing end of the slot 3 has a frusto-conical portion 5 into which the frusto-conical leading end 2a of the pin seats at the commencement of the driving action of the pin into the slot.

Figure 2:
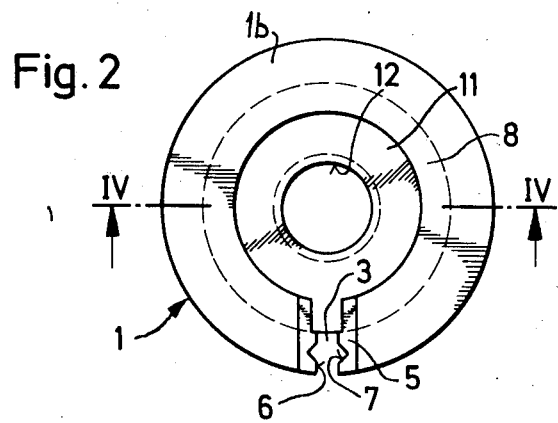
FIG. 2 is a top view taken in the direction of the arrow A shown in FIG. 1.
Figure 3:
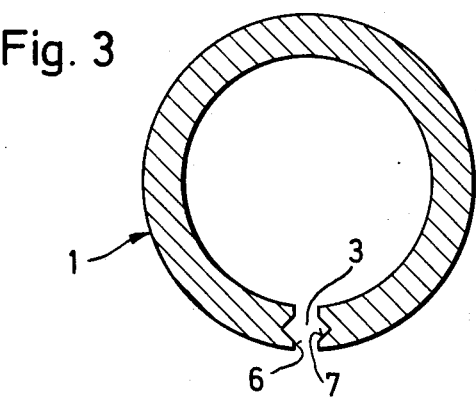
FIG. 3 is a cross-sectional view taken along the line III—III of FIG. 1.

As shown in FIGS. 2 and 3, the circumferentially spaced faces 6 of the slot 3 which extend in parallel relation with the axis of the sleeve each has a V-shaped guide groove 7 for the exact guidance of the pin 2 as it is driven through the slot.

Figure 4:
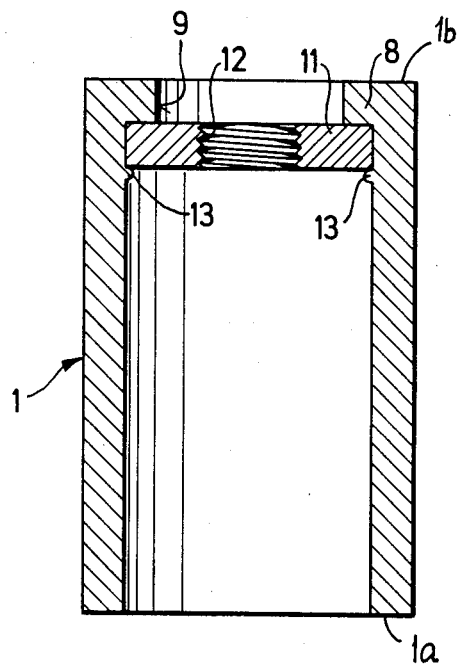
FIG. 4 is an axial cross-sectional view of the sleeve taken along the line IV—IV in FIG. 2.

As shown in FIG. 4, a radially inwardly projecting abutment or ring shoulder 8 on the trailing end 1b of the sleeve 1 forms an opening 9. Within the sleeve, a disk-shaped insert 11 bears against the ring shoulder 8 preventing the insert from being displaced outwardly from the sleeve. A centrally arranged threaded bore 12 is provided in the insert so that an object to be secured by the anchor can be fastened to the insert. While the insert is prevented from displacement from the trailing end of the sleeve 1 by the ring shoulder 8 it is also prevented from displacement forwardly through the sleeve by the retaining projections or cams 13 which extend inwardly from the inner surface of the sleeve 1. Further, the retaining projections 13 can also serve to secure the insert 11 against rotation within the sleeve. Inserts 11 capable of securing various size objects within the expansion sleeve 1 can be utilized because of the ability of the sleeve to expand radially. Accordingly, a sleeve with a compatible matching threaded bore can be provided for each of the different objects to be secured by the sleeve.

In use, a hole is bored into the material to which the expansion anchor is to be secured having a diametrical size so that the anchor or sleeve can be easily fitted within the hole. Next, the frusto-conical leading end 2a of the pin 2 is inserted into the correspondingly shaped frusto-conical trailing end 5 of the slot 3 and then the pin is driven axially through the slot toward the leading end 1a of the sleeve so that the sleeve is gradually expanded to assure a uniform engagement between the exterior surface of the sleeve and the surface of the hole into which the sleeve is inserted. As the pin is driven through the slot 3 it is guided by the grooves 7 in the juxtaposed faces 6 of the slot to assure the proper expanding action. Since the slot 3 extends in parallel relation with the axis of the sleeve 1 and is properly guided within the groove 7, the expanding action is transferred from the pin in a uniform manner to the sleeve over its entire axial length. The ring shoulder 8 and the retaining projections 13 extending inwardly from the sleeve are sized to assure the retention of the insert 11 during the expansion of the sleeve.

While a specific embodiment of the invention has been shown and described in detail to illustrate the application of the inventive principles, it will be understood that the invention may be embodied otherwise without departing from such principles.

What is claimed is:

1. An expansion anchor comprising an axially extending expansion sleeve having a leading end and a trailing end with the leading end arranged to be inserted into a hole prepared to receive the expansion sleeve, said sleeve having an inside surface and an outside surface, said sleeve having a slot extending between the inside and outside surfaces and from the leading end to the trailing end with the slot disposed in parallel relation with the axis of the sleeve, said slot having a constant dimension measured in the circumferential direction of the sleeve for at least a major portion of the axial length of the sleeve from its leading end towards its trailing end, and an expanding body displaceably engageable through said slot for expanding said sleeve, wherein the improvement comprises that said expanding body is an axially extending pin having an axially extending cylindrically shaped portion, and the cylindrically shaped portion of said expansion body has a diametrical dimension greater than the dimension of said slot measured in the circumferential direction of said sleeve prior to the expansion of said sleeve by the cylindrically shaped portion of said expanding body, said cylindrically shaped portion being axially displaceable through the length of said slot from the leading end to the trailing end thereof for increasing the diameter of the outside surface of said sleeve and expanding the outside surface of said sleeve into contacting engagement with a hole prepared to receive the expansion sleeve.

2. An expansion anchor, as set forth in claim 1, wherein said expanding body has a leading end and a trailing end with the leading end arranged to be inserted first into the slot in said sleeve, and said expanding body having a frusto-conical portion extending from the leading end and tapering outwardly from the leading end toward the trailing end and said cylindrically shaped portion extending from the larger diameter end of said frusto-conical portion toward the trailing end.

3. An expansion anchor, as set forth in claim 2, wherein said slot at the trailing end of said sleeve widens in a frusto-conical shape from the circumferentially measured dimension of said slot which is less than the diametrical dimension of said expansion body.

4. An expansion anchor, as set forth in claim 2, wherein said slot has a pair of juxtaposed faces arranged in opposing relationship and spaced apart in the circumferential direction of said sleeve, and at least one of said juxtaposed faces having a continuous groove therein extending parallel to the axis of said sleeve and extending from the leading end of said sleeve toward the trailing end thereof.

5. An expansion anchor, as set forth in claim 4, wherein each of the juxtaposed faces of said slot has the continuous groove therein and each of said grooves has a V-shaped configuration facing toward the oppositely disposed V-shaped grooves.

6. An expansion anchor, as set forth in claim 1, wherein said sleeve has a bore therethrough and the trailing end of said sleeve has an abutment extending inwardly into the bore.

7. An expansion anchor, as set forth in claim 6, wherein said abutment is an annular shoulder extending radially inwardly from the inside surface of said sleeve.

8. An expansion anchor, as set forth in claim 6, wherein an insert is positioned within the bore in said sleeve and bears against the abutment at the trailing end of said sleeve, said insert having a threaded bore therethrough for receiving and holding a member within said sleeve.

9. An expansion anchor, as set forth in claim 8, wherein retaining projections are formed on the inside surface of said sleeve adjacent to and spaced axially from said abutment so that said insert is held within said sleeve between said abutment and said retaining projections.

10. An expansion anchor, as set forth in claim 1, wherein said expanding body is formed of metal and said expansion sleeve is formed of a plastics material.

11. An expansion anchor, as set forth in claim 1, wherein said expanding body is formed of metal and said expansion sleeve is formed of metal.

12. An expansion anchor comprising an axially extending expansion sleeve having a leading end and a trailing end with the leading end arranged to be inserted first into a hole prepared to receive the expanding sleeve, said sleeve having an outside surface and an inside surface, said sleeve having a slot extending between the inside and outside surfaces from the leading end to the trailing end with the slot disposed in parallel relation with the axis of said sleeve, said slot having a constant dimension measured in the circumferential direction of said sleeve for at least a major portion of the axial length of the sleeve from its leading end to its trailing end, and an expansion body displaceably engageable through said slot for the expansion of said sleeve, wherein the improvement comprises that said slot at the trailing end of said sleeve widens in a frusto-conical shape and that the constant dimension measured in the circumferential direction of the sleeve extends forwardly from the smaller diameter end of the frusto-conically shaped portion to the leading end of the sleeve, said expanding body has a leading end and a trailing end with the leading end arranged to be inserted first into the frusto-conically shaped portion of the slot for subsequent displacement through the constant dimension portion of the slot for expanding the sleeve, the leading end of said expansion body having a frusto-conical end tapering outwardly in the direction from the leading end towards the trailing end and from the end of the frusto-conically shaped portion of said expansion body spaced from the leading end thereof to the trailing end said expansion body having a cylindrical shape of constant diameter greater than the circumferential dimension of said slot prior to the expansion of said sleeve, said slot having a pair of juxtaposed faces in opposing relationship spaced apart in the circumferential direction of said sleeve and said faces each having a continuous V-shaped groove therein parallel with the axis of said sleeve and extending from the leading end thereof toward the trailing end to the frusto-conical portion of said slot, said sleeve has a bore extending therethrough and the trailing end of said sleeve having a radially inwardly directed annular shoulder extending into said bore and forming an abutment, an insert positioned within the bore in said sleeve and bearing against the annular shaped shoulder at the trailing end of said sleeve, said insert having a threaded bore therethrough for receiving and holding a member within said sleeve, and retaining projections formed on the inside surface of said sleeve adjacent to and spaced axially from said abutment so that said insert is held within said sleeve between said abutment and said retaining projections.

* * * * *